United States Patent Office 2,890,173
Patented June 9, 1959

2,890,173

PRODUCTION OF CELLULATED SILICA

Walter D. Ford and Herbert H. Anderson, Port Allegany, Pa., assignors to Pittsburgh Corning Corporation No Drawing. Application August 19, 1953
Serial No. 375,300

16 Claims. (Cl. 252—62)

The present invention relates to a method of preparing a cellulated vitreous material and it has particular relation to a method of preparing cellulated silica from a suitable pulverulent batch.

It is known that cellular silica can be produced by heating a pulverized batch of silica, such as quartz sand, and a carbonaceous cellulating agent such as carbon black, powdered coal or other carbonaceous material to a temperature sufficient to sinter and cellulate the batch. The sintering temperature is the temperature at which the silica particles adhere together upon contact.

The cellulation of the silica results from a chemical reaction which takes place between the carbon and silica at the temperature approximating or slightly above the temperature of the sintering of the silica. In this reaction, gases such as silicon monoxide and carbon oxides are generated in situ in the sintered mass and are entrapped as bubbles which expand and impart to the mass a cellular structure. This results in a product of light weight and high resistance to the transmission of heat. The cell structures are in most cases sealed so that liquids or gases cannot permeate the cellulated material.

In the past, small masses of pulverulent batch material made up of silica and the cellulating agent have been sintered and uniformly cellulated in relatively short periods of time. As larger and larger masses were attempted to be cellulated, it was found that extremely long periods of heating were required in order to produce a uniformly cellulated product. If less than these long periods were employed, large cracks or voids appeared in the product and uniformity of cell size was not obtained. Uniformity of cell size is highly desirable in order to obtain maximum insulating efficiency.

In accordance with the present invention, large pulverulent masses of silica have been sintered and cellulated in a relatively short time to produce a product having uniform cell size. This has been accomplished by employing as the cellulating agent a small amount of a material which is produced by heating a mixture of a siliceous material such as silica, sand, quartz, chalcedony, jasper, etc. and a carbonaceous substance to calcine the mixture. The cellulating agent which is produced from such calcining operation is believed to be composed of pulverulent silica having a coating of small particles of silicon carbide thereon.

The cellulating agent is prepared by first combining the ingredients therefor intimately in pulverulent state. This is preferably done by means of a ball mill in which flint, porcelain, or other mineral balls are used as the grinding medium. During the milling, small portions of the balls are chipped or otherwise removed from the surface of the balls and added to the batch to be calcined.

Thus, if it is desired to have only silica and carbon in the batch to be calcined, flint balls are employed in the milling operation. However, if it is desired to combine other materials in the cellulating agent such as aluminum oxides, then porcelain balls, or balls of other mineral silicates such as aluminum silicates, or natural mineral silicates such as nepheline syenite, feldspar, etc. may be employed. The addition of other materials in this manner provides the uniform mixing of these materials in the batch which has been found to be necessary for the uniform cellulation of silica. It has also been found that the inclusion of materials such as aluminum oxides in the calcined cellulating agent is beneficial in preventing the formation of a "crust" or partially uncellulated layer on the surface of the cellulated silica.

As an alternative to adding such substances by using balls of like material in the ball milling operation, the substances may be merely added to the batch and ground therewith in the ball mill using suitable balls such as flint balls. The minerals which are added to the silica and carbon batch to be calcined may be added in their pure state or added as compounds such as oxides or silicates. For example, metals such as aluminum, magnesium, titanium, tungsten, vanadium, molybdenum, iron, manganese, zirconium and others may be added as such, as their oxides, or as they may occur in various natural mineral silicates.

The major portion of the batch which is to be calcined to form the cellulating agent is comprised of silica and carbon. These ingredients are usually employed in the ratio of a mole (60 parts) of silica to an atom (12 parts) of carbon and are preferably employed with an excess of silica to carbon on such basis. Where the ratio is 1 mole silica to 1 atom of carbon, the carbon amounts to 20% of the silica or 17% of the silica plus carbon. However, the ratio of carbon to silica may vary from only very small amounts, for example 1% by weight of silica, to very large amounts, for example 90% or greater. It has been found that as the preferred ratio of carbon to silica is exceeded, the time required to cellulate silica with the calcined cellulating agent is increased and thus excesses of one atom of carbon to one mole of silica are not usually desired.

When the ratio of carbon to silica is 1 part of carbon to 100 parts of silica as disclosed above, 1.1 parts of silicon carbide are formed with the consumption of 1.7 parts of silica. The resulting composition contains 98.3 parts of silica and 1.1 parts (approximately 1%) of silicon carbide. Likewise, when the ratio of carbon to silica is 20 parts of carbon to 75.4 parts of silica as disclosed in Example IV, 22.2 parts of silicon carbide are formed with the consumption of 33.3 parts of silica, producing a composition of 42.1 parts of silica and 22.2 parts (approximately 35%) of silicon carbide.

The amount of materials which may be present other than silica and carbon in the batch to be prepared into the calcined cellulating agent varies from traces up to 5 to 30% or larger, however, such materials are usually present in the amount of 3% to 8% by weight of the batch. One method of controlling the amount of addition of these materials is to vary the ratio of grinding balls employed in the grinding operation. For example, half of the balls may be flint balls and the remainder porcelain balls or other ratios may be employed.

The mixture of silica and carbon and other mineral material as described above is ground to an average particle size of about 2 to 4 microns as measured by the "Fisher Sub-Sieve Sizer." The "Fisher Sub-Sieve Sizer" is described on pages 148 and 149 of volume 23, Number 5 of "The Laboratory," published by Fisher Scientific Company of Pittsburgh, Pennsylvania. It measures average particle size by determining resistance to air flow of a weighed sample under standard packing conditions. The "Fisher Sub-Sieve Sizer" also is disclosed in Gooden Patent No. 2,261,802, granted November 4, 1941. In the examples also, the average particle size was determined by the same method. The ground mixture is then placed in a suitable furnace and heated to a temperature of about 2800° to 3050° F. and preferably 2900–2950° F. As more silica to carbon is employed in the batch, higher temperatures are employed. However, as the amount of other minerals as described above are incorporated in the batch, temperatures in the lower part of the range are satisfactory.

Best results have been obtained when the calcining operation is carried on for periods up to 1 hour or longer, but in any event, the heating should be carried on for a period long enough to permit reaction of the silica and carbon as hereinafter described. After heating, the mixture is in the form of sintered masses. These masses are then crushed to a particle size compatible for mixing with the silica to be cellulated, for example 15 to 20 mesh.

Considerable weight is lost by the batch during the calcining operation. The reaction between the silica and the carbon during the calcining is believed to form silica coated with minute particles of silicon carbide and carbon monoxide gases and silicon monoxide. The loss in weight is accounted for by the gases which are driven off. The calcining produces silicon carbide in particles of such size as have hereinbefore not been available. The particle size of the silicon carbide particles ranges from about 0.01 to 0.3 micron and this small particle size has enabled the rapid production of a more uniformly cellulated product.

The following examples illustrate methods of making the cellulating agent in accordance with this invention:

EXAMPLE I

Mixtures of silica and lamp black carbon in the ratio of 87.5 parts by weight of silica to 12.5 parts by weight of lamp black carbon were ground in a ball mill using flint balls for a period of time sufficient to reduce the average particle size of the mixture to about 2.5 microns. Portions of the ground mixture were then calcined for twenty minutes at 2620, 2810, 2910, and 3000° F. respectively. The cellulating agent thus produced was in the form of a sintered mass or masses. These sintered masses were crushed to a particle size of about 15 to 20 mesh and combined with sand as shown below in Example XIII.

EXAMPLE II

Mixtures of silica and lamp black carbon in the ratio of 87.5 parts silica to 12.5 parts carbon by weight were ground in a ball mill employing porcelain balls as the grinding medium for a time sufficient to achieve an average particle size of 2.5 microns. This pulverulent mixture was then heated to a temperature of 2925° for 60 minutes to produce a sintered cellulating agent. The sintered cellulating agent was then crushed to a size suitable for combining with the silica to be cellulated.

EXAMPLE III

A mixture containing 82% by weight of sand, 6% by weight of kyanite and 12% by weight of carbon was ground in a ball mill employing flint balls to achieve an average particle size of 2.5 microns. Portions of this pulverulent mixture were heated to temperatures of 2850, 2900, 2950 and 3000° F. for one hour to produce a cellulating agent in accordance with this invention.

EXAMPLE IV

The following mixtures of silica, carbon and alumina were each ground in a flint ball mill for 8 hours and then heated for one hour at a temperature of 2925° F.

| | Percent by weight | | | |
|---|---|---|---|---|
| | 1 | 2 | 3 | 4 |
| Sand | 86.8 | 83.0 | 79.2 | 75.4 |
| $Al_2O_3$ | 5.2 | 5.0 | 4.8 | 4.6 |
| Lampblack Carbon | 8.0 | 12.0 | 16.0 | 20.0 |

The sintered masses formed from such heating were then crushed and combined with silica as further described below in accordance with the invention.

In the practice of the invention a small cellulating amount of a cellulating agent produced as described above is added to pulverulent silica and the mixture is then ground and heated to a temperature sufficient to cause it to sinter and cellulate. The amount of such cellulating agent which is employed in combination with the silica is that amount which is sufficient to produce the degree of cellulation desired. Usually such amount of cellulating agent will be between 1.0 and 10.0 percent or higher by weight of silica and preferably 1.0 to 4.0 percent by weight of silica. In all events, the amount of cellulating agent which is used should not be so small as not to promote cellulation or so large that cellulation is prevented.

In the production of cellulated silica, various forms of silica may be employed as the principal ingredient of the batch which is prepared for cellulation. For example, sand has been found to be highly desirable in the practice of the invention. Likewise, flint, chalcedony, jasper and natural mineral silicates composed substantially completely of silica for reaction with the cellulating agent of the present invention are intended to be included in the term "silica." Usually the amount of silica to be employed in the batch to be cellulated constitutes more than 90 percent of the batch, preferably 95 to 99.5 percent by weight of the batch with the remainder constituting the cellulating agent and other auxiliary components as hereinafter described.

In addition to the cellulating agent and silica, the batch to be cellulated may include up to 10 percent by weight of the metals, or their compounds, such as oxides or silicates, set forth above in connection with the description of the manufacture of the cellulating agent. For example, aluminum may be added to the batch as such or as aluminum oxide or as an aluminum silicate such as kyanite, mullite or porcelain. Also in addition, natural mineral silicates such as feldspar and nepheline syenite may be added to the batch in place of or in addition to silica in amounts up to 10 percent or greater. In all events, it is desirable that the final cellulated product contain 90 percent or more by weight of silica and preferably 95 to 99.5 percent by weight of silica.

The silica to be cellulated is finely pulverized, for example, to a particle size that will pass a screen of 200 mesh or finer. This pulverized material may be ground with the cellulating agent and it has been found desirable to grind them together in a ball mill using flint balls or porcelain balls as the grinding medium as described above and for the reasons set forth above in the description of the preparation of the batch material which is calcined to form the cellulating agent.

The mixture to be cellulated is ground as fine as practicable in the ball mill and is then prepared for the sintering and cellulating operation. The mixture is pressed into suitable self-sustaining shapes as pellets, cones, slabs, or other suitably sized segments and placed on a suitable supporting means such as graphite slabs which are in turn introduced into the heating area. The pressing of the batch into self-sustaining shapes aids in the prevention of the formation of cracks in the mixture during cellulating.

It has been found that when large slabs of cellulated silica are to be produced, best results are achieved as far as uniformed cellulation is concerned, by segmenting the batch into small shapes and spacing them so that during cellulation they will expand and join to form a large continuous unitary structure. The size, number and placement of the compact segments on the graphite platen is dependent upon the size of cellulated silica desired to be produced. This segmenting of the batch also enables faster and more uniform heating of the match material.

The heating operation is performed preferably in a reducing or inert atmosphere and may be done in a carbon electric furnace in which an atmosphere of inert gases such as argon is maintained. The compressed batch can be heated in any convenient furnace, but in commercial operation a tunnel furnace having a suitable means designed to move the supporting graphite slabs through the heating zone is employed.

The graphite slabs and cellulating material thereon pass in a continuous line through the furnace and are positioned so that the cellulating material on each slab expands and joins with the cellulating material on the slabs immediately preceding and following to form a continuous sheet of the cellulated product. It has also been found desirable to place a layer of finely divided graphite on the graphite slab prior to placing of the compressed batch on the slab and also to apply a layer of finely divided graphite over the compressed batch prior to the heating. This is designed to prevent oxidation of the cellulating agent in the outer surface of the batch prior to the sintering of the silica. However, this is not necessary when the heating is conducted in a reducing or an inert atmosphere or when it is desired to produce a skin on the cellulated silica.

The heating operation is conducted slowly because of the low thermal conductivity of the powdered materials. Usually it is completed within a period of 15 to 20 or more minutes depending upon the thickness and size of the bodies to be formed. The temperature of the heating should be sufficient to sinter together the particles of silica and also to cause the cellulating agent to react with the silica. The temperature of heating for sintering and cellulating will vary but usually is in or near the range of 2100 to 3400° F. The majority of the sintering occurs in the range of 2100 to 2800° F. and the majority of the cellulating occurs within the range of 2600 to 3400° F.

After the mass has cellulated to the desired degree and while it is still plastic, it may be extruded or shaped by any suitable means into slab, sheet or other desired forms. For example, the plastic mass may be shaped into a slab by suitable graphite rollers while still within the furnace. The shaped plastic mass is then cooled to a rigid mass. The plastic mass is preferably cooled slowly to about 2500 to 1800° F. and may thereafter be exposed to the atmosphere.

The following examples are illustrative of the practice of the invention:

EXAMPLE V

A cellulating agent was prepared by grinding a mixture of 87.5 parts by weight of silica and 12.5 parts by weight of carbon in a ball mill employing flint balls as the grinding medium and heating this mixture at 2900° F. for 60 minutes to sinter and calcine it. The calcined material was then crushed to a particle size of about 15 mesh preparatory to being added to silica. The cellulating agent thus formed was gray in color.

One and six-tenths parts by weight of this cellulating agent was mixed with 100 parts by weight of sand and ground in a ball mill employing flint balls as the grinding medium to an average particle size of 2.5 microns. The mixture was then placed in a carbon electric furnace and heated in a reducing atmosphere up to a temperature of 3360° F. over a period of 20 minutes and heated at 3360° F. for 10 minutes to cellulate the mixture. A uniformly cellulated gray product having a density of 14 pounds per cubic foot was obtained.

EXAMPLE VI

The procedure of Example V was followed employing finely ground carbon in place of the cellulating agent described therein. In order to obtain a uniformly cellulated product free from cracks and large voids as produced in Example V, it was necessary to maintain the batch for about 45 minutes at a temperature of about 2800° F. before cellulating at 3360° F. for 10 minutes. When less time was taken at 2800° F. to bring the batch to cellulating temperature of 3360° F., cracks and large voids appeared in the product.

EXAMPLE VII

A cellulating agent was prepared by grinding for one hour 87.5 parts by weight of silica with 12.5 parts by weight of carbon in a ball mill employing porcelain balls as the grinding medium. The ground mixture was heated at 2900° F. for 60 minutes to sinter and calcine it. The sintered calcined material was then ground to a particle size of about 15–20 mesh for use as a cellulating agent.

One and six-tenths parts by weight of this cellulating agent and 100 parts by weight of silica were thoroughly mixed and ground in a ball mill employing flint balls as the grinding medium. The ground mixture was formed into segments one and a half inches square by five-eighths inch thick and 112 segments were placed in 8 rows of fourteen each on a 12 x 18 inch graphite slab. The segments had approximately one-quarter to three-eighths inch spacing between them on all sides.

The segments and graphite slab were then inserted into a carbon electric furnace which was in the form of a tunnel approximately 20 feet in length and in which an atmosphere of argon was maintained. The segmented batch moved through the furnace at the rate of 4 inches per minute and was raised gradually over a period of about 27 minutes from a temperature of 1000° F. to a maximum temperature of about 3360° F. and maintained at such temperature for approximately nine minutes. The segments by this time had sintered and cellulated to one continuous structure made up of uniform cells. As the cellulated structure passed further through the furnace, it was cooled to a temperature of 2500° F. at which temperature it was removed from the furnace and cooled to room temperature.

The product thus produced was a slab approximately 4 x 12 x 18 inches containing a multiple of minute uniform noncommunicating cells having an average diameter of about 0.15 to 0.2 inch. The product was light gray in color and had a density of about 12 pounds per cubic foot.

EXAMPLE VIII

A cellulating agent was prepared by grinding for one hour 82 parts by weight of sand, 6 parts by weight of kyanite and 12 parts by weight of carbon. This mixture was ground in a ball mill using porcelain balls as the grinding medium and then heated to a temperature of 2950° F. for one hour. This produced a sintered mass which was in turn crushed to a fine particle size suitable for use as a cellulating agent.

One and six-tenths parts by weight of the cellulating agent was ground together with 100 parts by weight of silica, compactly segmented and heated in a carbon electric furnace as described in Example VII.

The product was light gray in color and contained a plurality of minute, noncommunicating, uniformly sized cells. The density of the cellulated product was 12 pounds per cubic foot.

EXAMPLE IX

A 5000 gram mixture consisting of 83 percent by weight of sand, 5 percent by weight of alumina and 12 percent by weight of lampblack carbon was ground in a small Patterson pebble mill for 12 hours so as to produce a material having an average particle size of about 2.5 microns. The mill was 18 inches in length, and 15 inches in inside diameter and contained 90 pounds of flint pebbles having an average diameter of one inch.

This ground mixture was removed from the mill and heated at a temperature of 2920° F. for 1 hour. The mixture sintered together into a number of large, irregularly shaped jagged pieces. These pieces were crushed for use as a cellulating agent so as to pass a screen of 14 mesh.

A charge of 1000 pounds made up of 100 parts by weight of sand, 0.3 part by weight of $Al_2O_3$ and 1.6 parts by weight of the cellulating agent as produced above was placed in a ball mill four feet in diameter and 6 feet in length containing 4000 pounds of 2 inch diameter flint balls. This charge was ground for 12 hours to an average particle size of 2.5 microns. The ground material was then removed from the mill and used immediately or stored at room temperature until used.

Next, the ground batch material was compactly formed in segments by means of a suitable vibrating apparatus preparatory to being placed on graphite platens or slabs for insertion into the cellulating furnace. Segments of two different sizes were formed and placed on 12 x 18 inch graphite platens. Single segments 8 inches square and ½ to ¾ inch high were centrally placed on one series of platens. On another series of platens 112 small segments in 8 rows of 14 each were placed on each platen. These segments were 1½ inch high and 1½ x ⅝ inch in lateral dimension. The small segments had about ¼ to ⅜ inch spacing between them on all sides.

The segments were loaded on the graphite platens while the platens were either hot or cold. When the platens were continuously recycled within the furnace and were therefor maintained quite hot, for example 1400° F. when being loaded, the segments were first placed on a thin rigid sheet of cellular silica about ¼ x 12 x 18 inches in size and the sheet and segments then placed on the hot graphite platen within the furnace.

The furnace used was a carbon electric furnace in the shape of a long tunnel approximately 20 feet in length in which a reducing atmosphere comprising mainly carbon monoxide gas was maintained. The compacted batch moved through the furnace at a rate of 4 inches per minute and was raised gradually over a period of about 28 minutes from a temperature of about 1000° F. to a maximum temperature of 3400° F. and maintained near such maximum temperature for 9 to 10 minutes. After such heating the batch had sintered and cellulated on its supporting platen to a unitary structure containing a plurality of uniformly sized noncommunicating cells. Also, where a series of platens was employed each unitary structure expanded and connected to the cellulated material on the preceding and following platens.

As the cellulated mass passed further through the furnace at the rate of 4 inches per minute it was cooled over a period of 5 to 10 minutes to a temperature ranging from 2400 to 1800° F. The hot cellulated silica was removed from the furnace and allowed to cool in the open air. Some of the hot cellulated silica was removed from the furnace and immediately immersed in water at room temperature or below to rapidly cool it. No adverse effects were seen to occur from such rapid cooling.

The products thus produced were a slab approximately 2 x 12 x 12 inches from the single segment 8 x 8 x ½ inches and a slab 4 x 12 x 18 inches from the 112 segments. The slabs contained a multitude of minute, uniform, noncommunicating cells having an average inside diameter of 0.15 to 0.2 inch. The cellulated product was light gray in color and had a density of about 12 pounds per cubic foot.

EXAMPLE X

One and eight-tenths parts by weight of a cellulating agent prepared as in Example VII, 100 parts by weight of silica and 0.5 part by weight of kyanite were ground, segmented, heated to a temperature of 3360° F. and held at such temperature for a period of 10 minutes. A uniformly cellulated product having a density of 14 pounds per cubic foot was obtained.

EXAMPLE XI

A cellulating agent was prepared by grinding for one hour 66 parts by weight of sand, 22 parts by weight of feldspar and 12 parts by weight of carbon. This mixture was heated to a temperature of 2900° F. for one hour to produce a sintered calcined mass. The calcined mass was then crushed to a particle size of 15 to 20 mesh to serve as a cellulating agent for silica.

One and six-tenths parts by weight of the cellulating agent was ground with 100 parts by weight of silica, compactly segmented and heated in a carbon electric furnace as described in Example VII. A light gray cellulated material containing a multitude of noncommunicating cells and having a density of about 12 pounds per cubic foot was obtained.

EXAMPLE XII

One and eight-tenths parts by weight of a cellulating agent as prepared in Example VII, 100 parts by weight of silica and 1.5 parts by weight of feldspar were ground in a porcelain ball mill, segmented and heated as in Example VII to obtain a cellulated product having a density of 14 pounds per cubic foot.

EXAMPLE XIII

Varying amounts of the cellulating agents prepared as in Example I were added to batches of pulverulent silica in the percentages shown in the table below and sintered and cellulated for the times and temperatures indicated in the table. The results of the table were obtained by using 3 gram samples and heating at the cellulating temperature for about 4 minutes.

From the above examples it can be seen that the use of a cellulating agent prepared by calcining a mixture comprising silica and carbon enables the production of sizable pieces of cellulated silica on a commercially desirable basis. It can be seen in some instances that when the pulverulent batch containing the silica and cellulating agent was placed in the heating furnace and immediately brought up to cellulating temperature, a uniformly cellulated product was obtained. This illustrates that the heating time preliminary to cellulation need be only that time incidental to bringing the pulverulent batch up to the cellulating temperature.

It is not definitely known why the use of a cellulating agent as described above reduces the time necessary to heat pulverulent silica and carbon to cause it to cellulate; however, it is believed that it is due to the reduction in time required for an intermediate reaction between the carbon and silica. In accordance with the prior art, the following two reactions are believed to occur during the heating of the silica and carbon with silicon monoxide created thereby believed to be the principal cellulating gas:

(1) $SiO_2 + 3C \rightarrow SiC + 2CO$ (2) $SiC + 2SiO_2 \rightarrow 3SiO + CO$

Equation 1 is believed to be a slow reaction and the use of a cellulating agent prepared and described as above is thought to partially replace this reaction and reduce the time it requires.

Although the present invention has been described with reference to specific details of certain embodiments, it is not intended that such details be regarded as limitations upon the scope of the invention except insofar as included in the accompanying claims.

Table I

| Calcining Temp., °F. | Cellulating Agent, percent by wgt. of batch | Sintering Temp °F. | Sintering time, Minutes | Cellulating Temp., °F. | Cellulation, ccm. per gram | Remarks |
|---|---|---|---|---|---|---|
| 2,620 | 0.5 | 2,515 | 10 | 3,200 | None | Skin. |
| | 1.0 | ------ | ------ | 3,135 | Some | Do. |
| | 1.0 | ------ | ------ | 3,180 | Little | Do. |
| | 1.0 | 2,260 | 10 | 3,180 | None | |
| | 1.0 | 2,525 | 10 | 3,180 | do | |
| | 2.0 | 2,235 | 10 | 3,200 | 4.6 | Uniform. |
| | 2.0 | 2,300 | 5 | 3,200 | 3.7 | Do. |
| | 2.0 | 2,350 | 10 | 3,145 | 2.7 | Do. |
| | 2.0 | 2,400 | 10 | 3,150 | 3.7 | Do. |
| | 2.0 | 2,410 | 10 | 3,140 | 4.0 | Do. |
| | 2.0 | 2,550 | 10 | 3,100 | Little | Uniform, skin. |
| | 2.0 | 2,790 | 10 | 3,150 | do | Do. |
| | 4.0 | 2,315 | 10 | 3,150 | 4.2 | Holes. |
| | 4.0 | 2,385 | 10 | 3,150 | 5.0 | Do. |
| | 4.0 | 2,385 | 10 | 3,150 | 3.8 | Do. |
| | 4.0 | 2,500 | 10 | 3,100 | 3.3 | Uniform, skin. |
| | 4.0 | 2,670 | 10 | 3,130 | 4.3 | Holes. |
| 2,810 | 1.0 | 2,350 | 10 | 3,135 | Little | Do. |
| | 2.0 | 2,220 | 10 | 3,140 | 3.7 | Uniform. |
| | 2.0 | 2,320 | 10 | 3,140 | 3.9 | Do. |
| | 2.0 | 2,340 | 10 | 3,120 | 4.2 | Do. |
| | 2.0 | 2,430 | 10 | 3,140 | 3.7 | Holes. |
| | 2.0 | 2,525 | 10 | 3,135 | 3.0 | Uniform, skin. |
| | 2.0 | 2,720 | 10 | 3,110 | Little | Do. |
| | 3.0 | 2,340 | 5 | 3,145 | 4.6 | Holes. |
| | 3.0 | 2,350 | 10 | 3,150 | 5.0 | Do. |
| | 3.0 | 2,530 | 10 | 3,150 | 4.5 | Uniform. |
| | 3.0 | 2,735 | 10 | 3,140 | Fair | Do. |
| | 4.0 | 2,555 | 10 | 3,170 | 4.4 | Holes. |
| | 4.0 | 2,620 | 10 | 3,135 | 4.7 | Do. |
| | 1.0 | 2,375 | 10 | 3,140 | 2.6 | Uniform. |
| | 1.0 | 2,520 | 10 | 3,100 | | Do. |
| | 1.7 | 2,300 | 0 | 3,200 | 4.4 | Do. |
| | 1.7 | 2,360 | 10 | 3,150 | 4.4 | Do. |
| | 1.7 | 2,520 | 10 | 3,135 | 3.4 | Do. |
| | 2.0 | 2,110 | 10 | 3,170 | 4.4 | Do. |
| | 2.0 | 2,240 | 10 | 3,165 | 5.1 | Do. |
| | 2.0 | 2,330 | 0 | 3,150 | 4.6 | Do. |
| | 2.0 | 2,325 | 2 | 3,150 | 4.6 | Do. |
| | 2.0 | 2,320 | 5 | 3,170 | 4.6 | Do. |
| | 2.0 | 2,345 | 10 | 3,165 | 5.0 | Do. |
| | 2.0 | 2,340 | 20 | 3,150 | 4.4 | Do. |
| | 2.0 | 2,360 | 10 | 3,150 | 4.8 | Do. |
| | 2.0 | 2,425 | 10 | 3,160 | 4.8 | Do. |
| | 2.0 | 2,520 | 10 | 3,155 | 4.3 | Do. |
| | 2.0 | 2,610 | 10 | 3,150 | 4.3 | Do. |
| | 2.0 | 2,690 | 10 | 3,135 | 3.6 | Uniform, skin. |
| | 2.0 | 2,790 | 10 | 3,120 | 3.2 | Do. |
| 2,910 | 2.0 | ------ | ------ | 3,110 | 4.2 | Holes, skin. |
| | 2.2 | 2,350 | 10 | 3,155 | 4.8 | Uniform. |
| | 2.2 | 2,525 | 10 | 3,150 | 4.2 | Do. |
| | 2.2 | 2,710 | 10 | 3,130 | 3.2 | Uniform, skin. |
| | 2.3 | 2,200 | 10 | 3,175 | 5.4 | Holes. |
| | 2.3 | 2,330 | 10 | 3,145 | 5.0 | Uniform. |
| | 2.3 | 2,385 | 10 | 3,130 | 5.2 | Do. |
| | 2.3 | 2,520 | 10 | 3,135 | 4.5 | Do. |
| | 2.3 | 2,570 | 10 | 3,130 | 4.0 | Uniform, skin. |
| | 2.3 | 2,710 | 10 | 3,120 | 4.0 | Do. |
| | 2.4 | 2,120 | 10 | 3,170 | 5.0 | Holes. |
| | 2.4 | 2,230 | 10 | 3,150 | 5.0 | Uniform. |
| | 2.4 | 2,360 | 10 | 3,160 | 5.0 | Do. |
| | 2.4 | 2,520 | 10 | 3,150 | 4.0 | Uniform, skin. |
| | 2.6 | 2,270 | 10 | 3,150 | 5.4 | Holes. |
| | 3.0 | 2,375 | 10 | 3,150 | 5.0 | Do. |
| | 3.0 | 2,550 | 10 | 3,155 | 5.4 | Do. |
| | 3.0 | ------ | ------ | 3,130 | 5.5 | Do. |
| | 2.0 | 2,355 | 10 | 3,130 | 4.0 | Uniform. |
| | 2.0 | 2,525 | 10 | 3,120 | 3.4 | Do. |
| 3,000 | 2.0 | 2,700 | 10 | 3,100 | Little | Uniform, skin. |

We claim:

1. A composition of matter consisting essentially of at least 70% pulverulent silica containing a coating of minute particles of silicon carbide from 0.01 to 0.3 micron in size thereon, the silicon carbide constituting from about 1% to about 35% of the silica-silicon carbide mixture, and the balance of the composition being selected from the group consisting of aluminum, magnesium, titanium, tungsten, vanadium, molybdenum, iron, manganese and zirconium oxides and silicates.

2. A composition of matter consisting essentially of at least 70% pulverulent silica containing a coating of particles of silicon carbide thereon, said silicon carbide particles being less than one micron in size, the silicon carbide constituting from about 1% to about 35% of the silica-silicon carbide mixture and the balance of the composition being selected from the group consisting of aluminum, magnesium, titanium, tungsten, vanadium, molybdenum, iron, manganese and zirconium oxides and silicates.

3. A composition of matter consisting essentially of at least about 92% and not more than about 97% of pulverulent silica containing minute particles of silicon carbide thereon, wherein the silicon carbide particles are less than one micron in size and the silicon carbide constitutes from about 1% to about 35% of the silica-silicon carbide mixture, the balance of the composition being selected from the group consisting of mineral silicates and oxides.

4. A composition of matter consisting essentially of at least about 92% and not more than about 97% of pulverulent silica containing minute particles of silicon carbide thereon and about 3% to about 8% alumina, wherein the size of the silicon carbide particles is in the range of 0.01 to 0.3 micron and the silicon carbide constitutes from about 1% to about 35% of the silica-silicon carbide mixture.

5. A composition of matter consisting essentially of at least 70% pulverulent silica containing a coating of silicon carbide thereon, said silicon carbide particles being less than one micron in size, the silicon carbide constituting from about 1% to about 35% of the silica-silicon carbide mixture and the balance of the composition being selected from the group consisting of mineral silicates and oxides.

6. A method of making a product as defined in claim 1 containing silicon carbide in fine particle form, which comprises heating a pulverulent mixture comprising silica, and containing, by weight, carbon in an amount of 1 to 21% of the silica and up to 30% of mineral silicates to a temperature of about 2600–3050° F. for a time sufficient to cause the silica and carbon to react and form a coating of small particles of silicon carbide on the pulverulent silica.

7. A method of making a product as defined in claim 2 containing silicon carbide in fine particle form, which comprises heating a pulverulent mixture comprising by weight about 66 to 88 parts silica, 8 to 20 parts carbon and up to 30% of mineral silicates to a temperature of about 2600–3050° F. for a time sufficient to cause the silica and carbon to react and form a coating of small particles of silicon carbide on the pulverulent silica.

8. A method according to claim 6, wherein the silica in the pulverulent mixture has a particle size of about 2 to 4 microns.

9. A method of preparing cellulated silica, which comprises heating a pulverulent mixture comprising by weight at least 90% silica and about 1 to 10% of silica containing a coating of silicon carbide thereon to a temperature above the sintering temperature of silica and within the range of about 2600–3400° F. for a time sufficient to cause it to sinter and cellulate.

10. A method of preparing cellulated silica, which comprises heating a pulverulent mixture comprising by weight at least 90% silica and about 1 to 10% of a calcined mixture comprised of silica and an amount of carbon equal to 1–90% of the silica in the calcined mixture to a temperature above the sintering temperature of silica and within the range of about 2600–3400° F. for a time sufficient to cause it to sinter and cellulate.

11. A method of preparing cellulated silica, which comprises calcining at a temperature of about 2600–3050° F. a pulverulent mixture in which the major portion by weight consists of silica and carbon and in which the carbon is equal to 1–90% of the silica, combining from 1 to 10% of the calcined material with silica to form a pulverulent mixture thereof, and heating said combined mixture to a temperature above the sintering temperature of silica and within the range of about 2600–3400° F. for a time sufficient to cause it to sinter and cellulate.

12. A method of preparing cellulated silica, which comprises calcining at a temperature of about 2600–3050° F. a pulverulent mixture in which the major portion by weight consists of silica and carbon and in which the carbon is equal to 1–90% of the silica and the mixture contains up to 10% of a substance selected from the group consisting of aluminum, aluminum oxides and aluminum silicates, combining 1 to 10% of the calcined material with silica to form a pulverulent mixture thereof, and heating the combined mixture to a temperature above the sintering temperature of silica and within the range of about 2600–3400° F. for a time sufficient to cause it to sinter and cellulate.

13. A method of preparing cellulated silica, which comprises calcining at a temperature of about 2600–3050° F. a pulverulent mixture in which the major portion by weight consists of silica and carbon and in which the carbon is equal to 1–90% of the silica, combining 1 to 10% of the calcined material with silica to form a pulverulent mixture thereof, segmenting the combined mixture, and heating the segmented mixture to a temperature above the sintering temperature of silica and within the range of about 2600–3400° F. for a time sufficient to cause it to sinter and cellulate.

14. A method of preparing cellulated silica, which comprises making a cellulating agent by heating a pulverulent mixture comprising silica and containing, by weight, carbon in an amount of 1 to 90% of the silica and up to 30% of mineral silicates to a temperature of about 2600–3050° F. for a time sufficient to cause the silica and carbon to react and form a coating of small particles of silicon carbide on the pulverulent silica, preparing a pulverulent mixture containing by weight at least 90% of silica, about 1 to 10% of said cellulating agent and up to about 30% of a substance from the group consisting of metal oxides and silicates, and heating the mixture to a temperature above the sintering temperature of silica and within the range of about 2600–3400° F. for a time sufficient to cause the pulverulent mixture to sinter and cellulate.

15. A method according to claim 14, wherein the pulverulent mixture to be cellulated contains by weight at least 90% silica and from 1 to 4% of said cellulating agent.

16. A method according to claim 14, wherein the pulverulent mixture to be cellulated is of a particle size to pass a screen of 200 mesh.

References Cited in the file of this patent

UNITED STATES PATENTS

| | | |
|---|---|---|
| 1,474,559 | Smith | Nov. 20, 1923 |
| 2,000,240 | Long | May 7, 1935 |
| 2,250,009 | Coble | July 22, 1941 |
| 2,388,080 | Riddle | Oct. 30, 1945 |
| 2,431,327 | Geiger | Nov. 25, 1947 |
| 2,526,073 | Gardner | Oct. 17, 1950 |
| 2,654,136 | Harford et al. | Oct. 6, 1953 |

OTHER REFERENCES

Industrial Chemistry, 5th ed., Riegel, Reinhold Pub. Corp., 1949, pages 334–337.